US005575404A

United States Patent [19]
Bohnert

[11] Patent Number: 5,575,404
[45] Date of Patent: Nov. 19, 1996

[54] APPARATUS FOR HANDLING COMPONENTS

[75] Inventor: Larry J. Bohnert, Monroe, Wis.

[73] Assignee: Honeywell Inc., Minneapolis, Minn.

[21] Appl. No.: 522,206

[22] Filed: Aug. 31, 1995

[51] Int. Cl.[6] ........................................ B23Q 7/12
[52] U.S. Cl. ............................... 221/167; 221/200
[58] Field of Search .......................... 221/200, 277, 221/167, 171, 173, 163; 198/373, 380

[56] References Cited

U.S. PATENT DOCUMENTS

| 3,275,120 | 9/1966 | Gardner | 221/167 |
| 3,658,207 | 4/1972 | Schultz | 221/167 |
| 5,269,440 | 12/1993 | Bohnert et al. | 211/200 |

*Primary Examiner*—Kenneth Noland
*Attorney, Agent, or Firm*—William D. Lanyi

[57] ABSTRACT

A sorting and feeding apparatus causes components to be deposited into the central portion of a rotatable tube. As the tube rotates, the components are caused to move out of a first end or a second end of the tube, depending on the physical orientation of the components when they are deposited into the tube's central portion. When the components have a first end that has a larger diameter than a second end, rotation of the tube causes the components to move in a direction away from the larger diameter end and toward the smaller diameter end. This principle is used to urge the components to exit from the rotatable tube at an end of the tube that is determined by the physical orientation of the component. Components that are oriented in a desirable direction are fed into an associated apparatus or machine while the components that are oriented in an undesirable direction are returned to a feeding mechanism that recycles them back to the central portion of the tube.

9 Claims, 9 Drawing Sheets

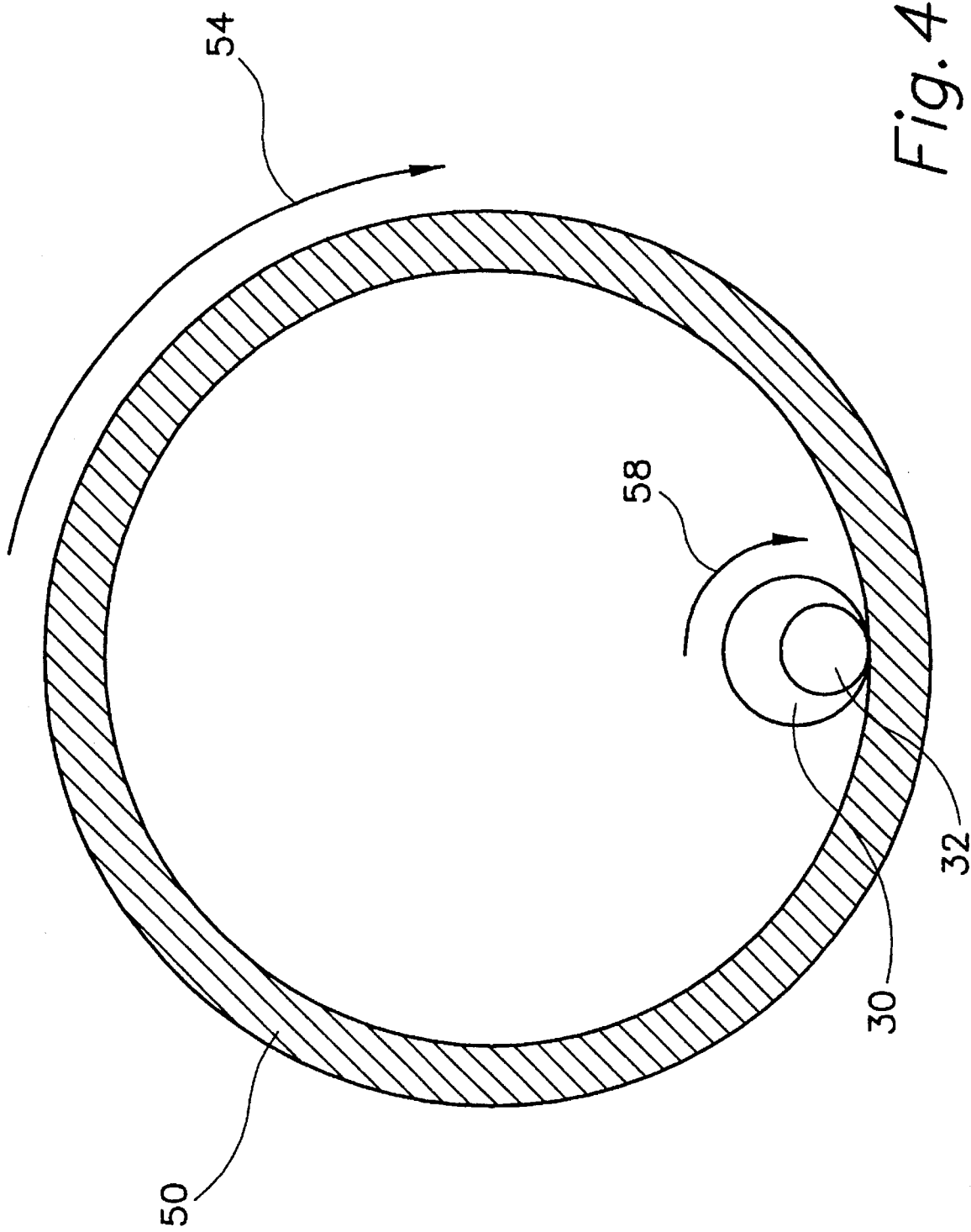

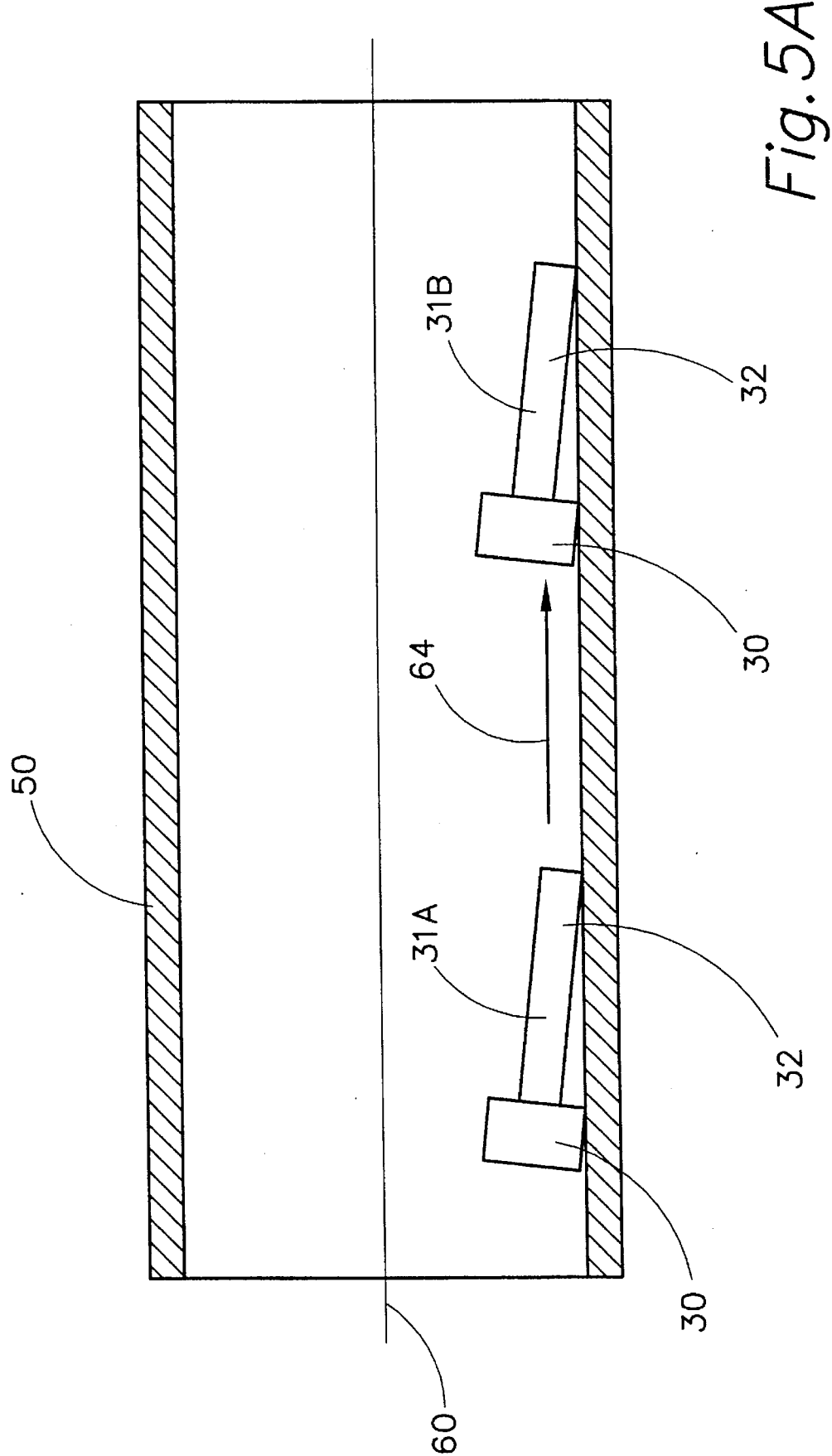

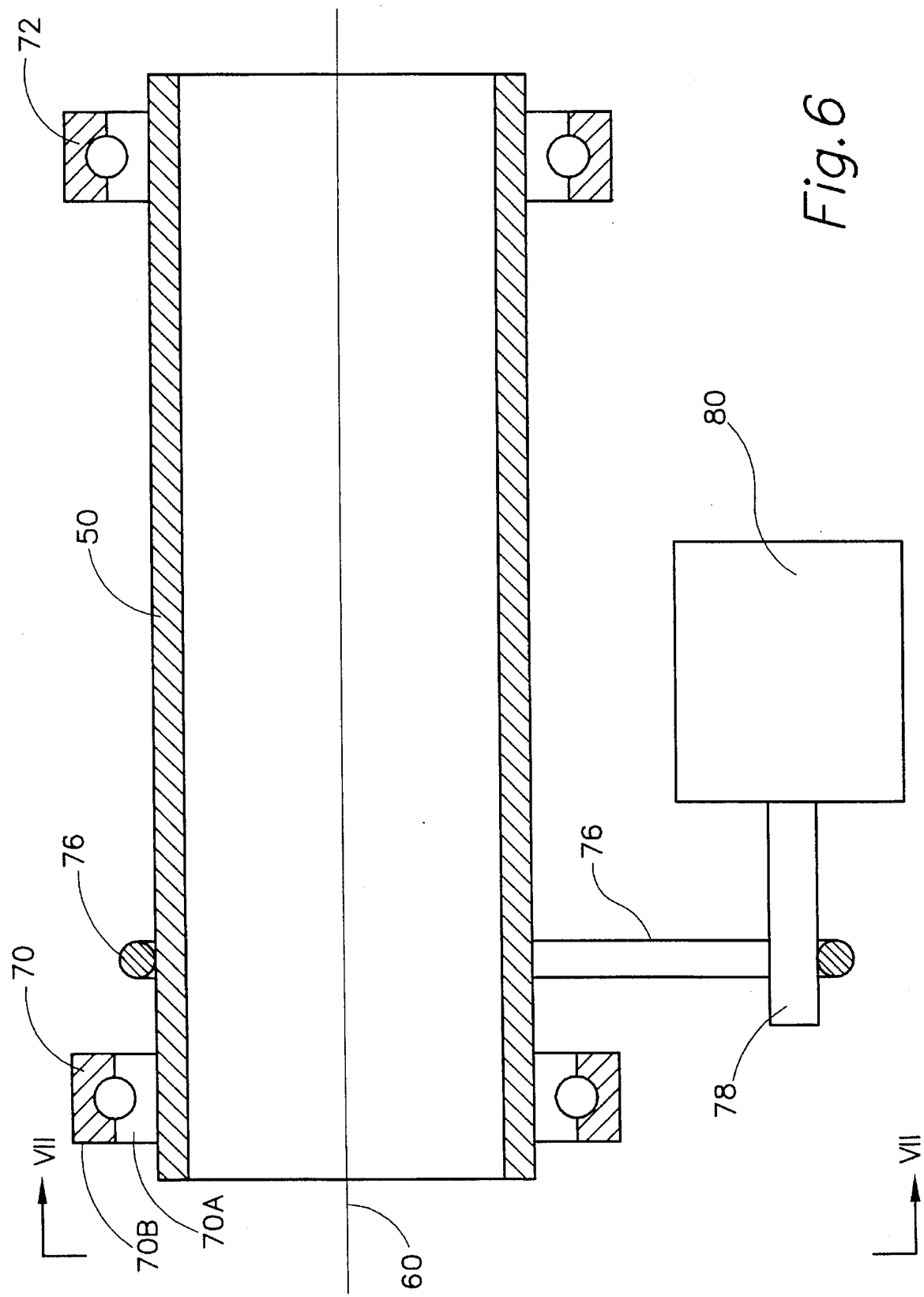

APPARATUS FOR HANDLING COMPONENTS

BACKGROUND OF THE INVENTION

1. Field of the Invention

The present invention is generally related to an apparatus for handling a plurality of components and, more particularly, to a device that sorts rotatable objects according to their direction of alignment.

2. Description of the Prior Art

Many different types of apparatus for feeding and sorting components are known to those skilled in the art. These devices are generally associated with a machine that performs an operation on the individual components. The devices are generally used to sort and then feed the components into the associated machine. For example, an automatic screw machine can be configured to receive screws that are fed to it by a vibratory bowl feeder and a feeder track.

Vibratory feeders have been developed over the years for the purpose of sorting small components according to size, position, shape or orientation. Vibratory feeders typically incorporate various types of sorting mechanisms within spiral shaped tracks that are attached to the inside walls of the bowl. An example of a vibratory bowl feeder can be found in U.S. Pat. No. 5,269,440 which issued to Bohnert et al on Dec. 14, 1993.

U.S. Pat. No. 5,269,440 discloses a vibratory bowl feeder that is provided with an automatic clean out feature which comprises an opening formed in the bottom surface of the bowl proximate a ramp formed on that bottom surface. The ramp extends a predetermined angular distance around the bottom surface of the bowl and locally raises the surface that parts or components pass along as they move in response to the vibrations of the bowl. The raised surface of the ramp creates a step between the upper most surface of the ramp and the bottom surface of the bowl proximate the opening formed in the bottom surface of the bowl. A door is provided to selectively cover and uncover the opening. During normal operation, the door is closed and parts pass over the ramp, along the upper surface of the door and back to the bottom surface in response to the vibration of the bowl. When the door is moved to expose the opening in the bottom surface of the bowl, parts moving up the ramp surface fall down across a step between the ramp surface and the opening and through the opening to a container, or receiver, that is placed under the opening. In addition, a stream of air is selectively used to force components from the helical track of the bowl back toward the bottom surface to subsequently be removed through the opening as described above.

Certain automatic gauging orienting and feeding devices incorporate two counter-rotating rollers aligned with their central axes in a slightly nonparallel association. The diameters of the rollers are accurately machined and the outer cylindrical surfaces of the rollers are finely polished. One such automatic gage orienting and feeding roller system is available in commercial quantities from Automation Associates Incorporated or Syntron Corporation. Devices of this type are also available in commercial quantities from the Moorfeed Corporation. Also, the Roller Mike Corporation manufactures equipment that is intended to sort parts quickly and accurately.

Certain types of components present a particularly difficult problem when an attempt is made to feed those components automatically through sorting designs that are currently known to those skilled in the art. One shape of component that is difficult to sort using known techniques is a cylindrical object which has one end of a larger diameter than the other end. The object could be, for example, a tapered pin or a bolt. It would therefore be significantly advantageous if an economical sorting apparatus could be developed which efficiently sorts components of this type as a function of their orientation.

SUMMARY OF THE INVENTION

A component handling apparatus made in accordance with the concepts of the present invention comprises a rotatable tube that has a central axis, a first end, a second end and a central portion between the first and second ends. In addition, it comprises a means for serially feeding a plurality of components into the central portion of the rotatable tube. A preferred embodiment of the present invention also comprises a first means, disposed proximate the first end of the rotatable tube, for receiving selected components that are deposited into the central portion of the rotatable tube with a first orientation and which move out of the first end of the rotatable tube. A means is provided for returning those selected components to the serially feeding means. A preferred embodiment of the present invention further comprises a second means for receiving selected others of the components which are deposited into the central portion of the rotatable tube with a second orientation that is different than the first orientation. A means is also provided for rotating the rotatable tube about its central axis.

In a typical application of the present invention, the serially feeding means comprises a vibratory bowl feeder, or a functional equivalent, in combination with an attached feeder track. A distal end of the feeder track extends into the rotatable tube proximate the central portion of the tube.

The present invention is particularly intended to handle and sort components that are generally cylindrical with one end having a larger diameter than the other end. The rotatable tube can be provided with a plurality of radial openings that extend through the wall of the tube. The purpose of the radial openings is to allow dirt and debris to fall out of the tube.

BRIEF DESCRIPTION OF THE DRAWINGS

The present invention will be more fully and completely understood from a reading of the Description of the Preferred Embodiment in conjunction with the drawings, in which:

FIG. 4 is a sectional view of a rotatable tube with component disposed within it;

FIG. 5A is a sectional side view of a rotatable tube with a component disposed within it;

FIG. 6 shows a rotatable tube associated with a means for rotating the tube about a central axis;

DESCRIPTION OF THE PREFERRED EMBODIMENT

Figure 1C:
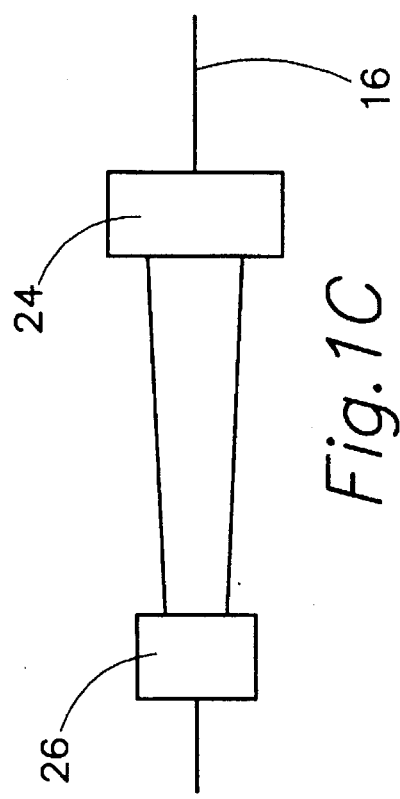
FIGS. 1A–1D show several types of components that can be sorted and fed by the present invention.

Throughout the Description of the Preferred Embodiment, like components will be identified by like reference numerals.

Of the many types of components that are automatically sorted and fed to machinery, certain shapes of components present particular difficulty when it is necessary that a machine automatically sort the components by their orientation or direction of alignment. FIGS. 1A–1D show several examples of components that could present particular problems for automatic sorting equipment. In FIG. 1A, a generally cylindrical member 10 has a knurled portion 12 that has a slightly enlarged diameter relative to the unknurled portion of the component. Although the knurled portion 12 is shown in FIG. 1A as comprising a diametric step compared to the unknurled portion 10, in certain applications the transition portion 14 between the two diameters is much more gradual than shown in FIG. 1A. The component illustrated in FIG. 1A is generally cylindrical and has a central axis 16.

Figure 1D:
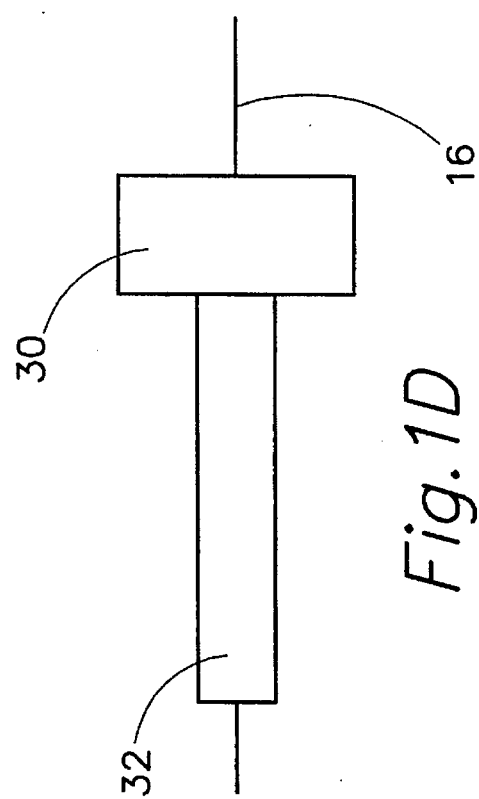
Figure 1A:
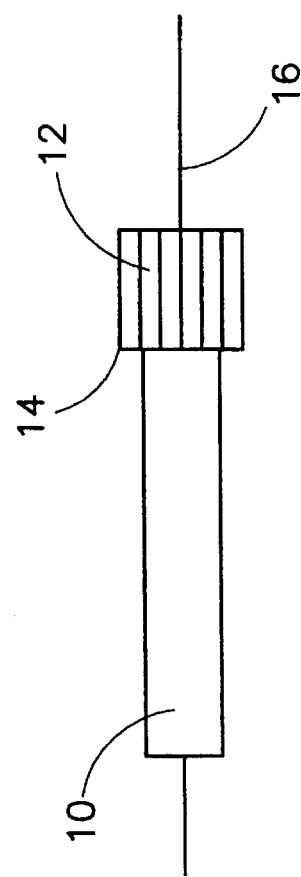
Figure 1B:
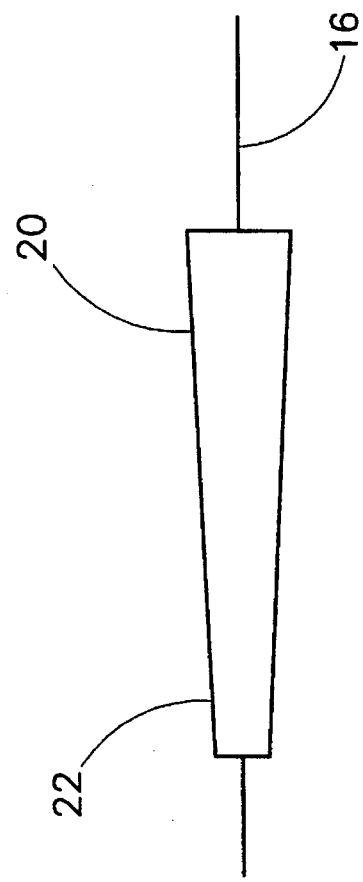

In FIG. 1B, a tapered pin has first and second ends. The first end 20 has a larger diameter than the second end 22. The pin is generally symmetrical about its central axis 16.

FIG. 1C illustrates a component that is symmetrical about axis 16 and which is provided with a first upset end 24 and a second upset end 26. As illustrated in FIG. 1C, the first upset end 24 has a larger diameter than the second upset end 26.

FIG. 1D illustrates a component that is generally symmetrical about axis 16 and which has a generally cylindrical head 30 attached to a shaft 32. The component in FIG. 1D is generally similar to a cap screw that is typically circular in cross section.

The components illustrated in FIGS. 1A–1D present certain problems to the designer of automatic sorting and feeding equipment. Most particularly, when the components must be sorted according to their orientation prior to feeding them into an automatic machine, the equipment and fixtures required to perform the function can become excessively expensive. In FIGS. 1A–1D, all of the components have been illustrated with their larger end shown to the right of their respective Figures. The end with the smaller diameter is shown to the left of each of the illustrations. If it is required that the automatic sorting and feeding equipment always deliver the component to the next workstation with a particular orientation (i.e. the smaller diameter end leading the larger diameter end or vice versa), the necessary equipment and fixtures to perform this task can be prohibitively expensive and complex.

Figure 2:
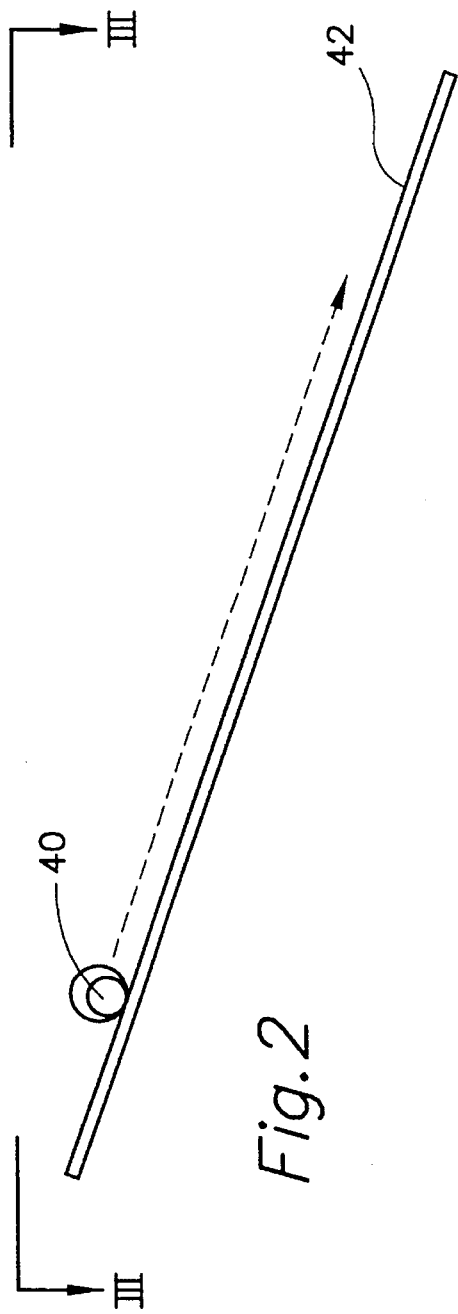
FIGS. 2 and 3 illustrate the basic principle of operation of the present invention.
Figure 3:
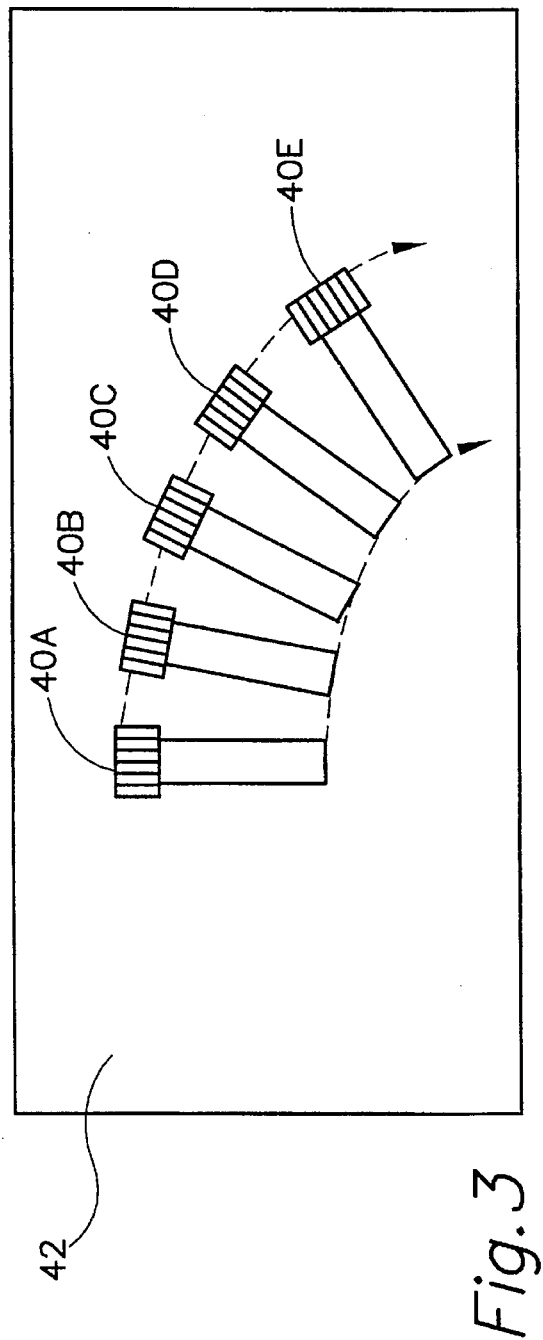

The present invention solves this sorting problem by taking advantage of the difference in the diameters of the two ends of the components. FIGS. 2 and 3 illustrate the basic physical principle that is advantageously applied by the present invention. FIG. 2 is a side view of a component, such as that illustrated in FIG. 1A, rolling down a sloped ramp 42. The component is identified by reference numeral 40 and is illustrated in an end view with the smaller diameter end 10 facing the viewer and the larger diameter knurled end 12 facing away from the viewer in FIG. 2. The arrow, which is shown as a dashed line, indicates the direction of travel of the component 40 in response to the effects of gravity.

FIG. 3 is a top view of the representation illustrated in FIG. 2. If a component, such as that which is identified by reference numeral 40 in FIGS. 2 and 3, is placed on an inclined plane, its path in response to gravity will be determined by the relative magnitudes of the diameters of its ends. For example, the component 40 is shown in FIG. 3 at various chronological steps as it rolls down the inclined plane 42. These successive stages are identified by reference numerals 40A, 40B, 40C, 40D and 40E. When the component is initially placed on the inclined plane 42 with its central axis generally perpendicular to the direction of slope of the plane, as represented by reference numeral 40A, it will begin to roll down the slope because of the effects of gravity. However, the path along which the component rolls will not be straight down the plane 42 if the two ends of the component are not of equal diameter. Since the component is made of a single integral piece, both ends of the component must rotate an equal number of times as it rolls down the slope. Since the first end has a larger diameter than the second end, each rotation of the component will cause the circumference of the first end to travel a greater distance than the distance traveled by the circumference of the second end. This relationship, in turn, will cause the component to travel along a curved path as represented by the dashed arrows in FIG. 3. The radius of curvature of the curved path is determined by the relative diameters of the first and second ends of the component. As the component moves to the position identified by reference numeral 40B, it can be seen that the first end of the component has traveled a slightly greater distance than the second end. As the component successively moves to positions identified by reference numerals 40C and 40D, the radius of curvature of the effective path continues to divert the component away from a direct line that extends straight down the surface of the inclined plane from top to bottom. As the component reaches the position identified by reference numeral 40E, the divergence of the path from a straight line is clearly apparent.

If the component illustrated in FIG. 3 had been placed on the inclined plane 42 with the opposite orientation and released to roll down the slope, it would travel a path that would curve in the opposite direction of the dashed arrows shown in FIG. 3. Therefore, it can be stated that an object that has ends of different diameters will follow a path that generally curves toward the direction of its smaller diameter and away from the direction of its larger diameter. The present invention takes advantage of this physical characteristic.

With continued reference to FIG. 3, it can be observed that the component continues to move toward the edge of the inclined plane 42 until its orientation is completely turned so that its largest diameter faces directly down the inclined plane. If a means could be provided to prevent this turning of the first end toward the bottom of the inclined plane while leaving the general behavior of the component unaffected, it would be possible to maintain the position of the component with its central axis generally perpendicular to an axis extending downward along the inclined plane as represented by reference numeral 40A in FIG. 3. If this orientation could be maintained while taking advantage of the tendency of the component to move toward the edge of the inclined plane 42 represented at the bottom of FIG. 3, the component could be caused to move in a predictable direction as a function of its orientation. In other words, components oriented in the manner shown in FIG. 3 would move downward in the Figure while components oriented in the opposite direction would move upward in the Figure. This distinctive movement as a function of orientation can be used advantageously to sort components. In a preferred embodiment of the present invention, a rotatable tube is used to simulate an infinitely long inclined plane 42.

In FIG. 4, a rotatable tube 50 is provided and a component is disposed within the inside surface of the tube. For purposes of the illustration shown in the following Figures and the description below, the component illustrated in FIG. 1D will be used. If the component is disposed within the tube 50, and the tube is rotating as indicated by arrow 54, the component will achieve one of two orientations. The smaller diameter shaft 32 will either point in a direction generally parallel to the central axis of the tube and facing out of the page or it will point it a direction generally parallel to the axis of the tube and pointing into the page. Although a slight possibility exists that a component will momentarily move into a position with its central axis disposed in a generally nonparallel relationship to the central axis of the tube 50, this misalignment will be temporary and the component will quickly achieve one of the two positions described immediately above. In response to the rotation of the tube 50 as indicated by arrow 54, the component will rotate in the direction represented by arrow 58.

FIG. 5A is a side view of the rotatable tube 50. For purposes of describing the operation of the present invention, a cap screw such as that shown in FIG. 1D is illustrated in the tube at two sequential positions that are represented by reference numerals 31A and 31B. It should be understood that other types of components could also have been used for these purposes and could alternatively be sorted by the present invention. If the cap screw is placed at the location represented by reference numeral 31A and the rotatable tube 50 is rotated about its central axis 60, it will move in the direction represented by arrow 64. During this movement of the cap screw within the tube, it will also assume a position with its smaller diameter end moved slightly toward the left in FIG. 4. This slightly skewed position is caused by the same type of behavior described above in conjunction with FIG. 3. For each rotation of the cap screw in the direction represented by arrow 58, the larger diameter 30 will traverse a greater distance than the smaller diameter 32. Since the component is rolling in a clockwise direction in FIG. 4, the larger diameter end 30 will roll a greater distance in that direction than the smaller diameter 32. This will place the smaller diameter 32 toward the left in FIG. 4 relative to the larger diameter 30. However, the general movement of the component within the tube 50 will maintain the position of the component near the bottom of the internal surface of the rotatable tube 50 due to the effects of gravity and a general smoothness of the inside surface of the tube.

With reference to FIG. 5A, the physical behavior described above in conjunction with FIGS. 2 and 3, will cause the cap screw shown in FIG. 5A to move from the left toward the right as represented by arrow 64. Eventually, as the cap screw moves from the position identified by reference numeral 31A to the position identified by reference numeral 31B, it will move in a preselected direction that is a function of its orientation when the cap screw is initially deposited within the inside surface of the tube 50. This predictable movement of the cap screw, or other item to be sorted, can be used advantageously to sort a plurality of similar components according to their orientation. It should be understood that throughout the Description of the Preferred Embodiment, the orientation of the components is generally equivalent to their alignment direction. As described above, this alignment direction or orientation can easily be limited to one of two opposite orientations.

Figure 5B:
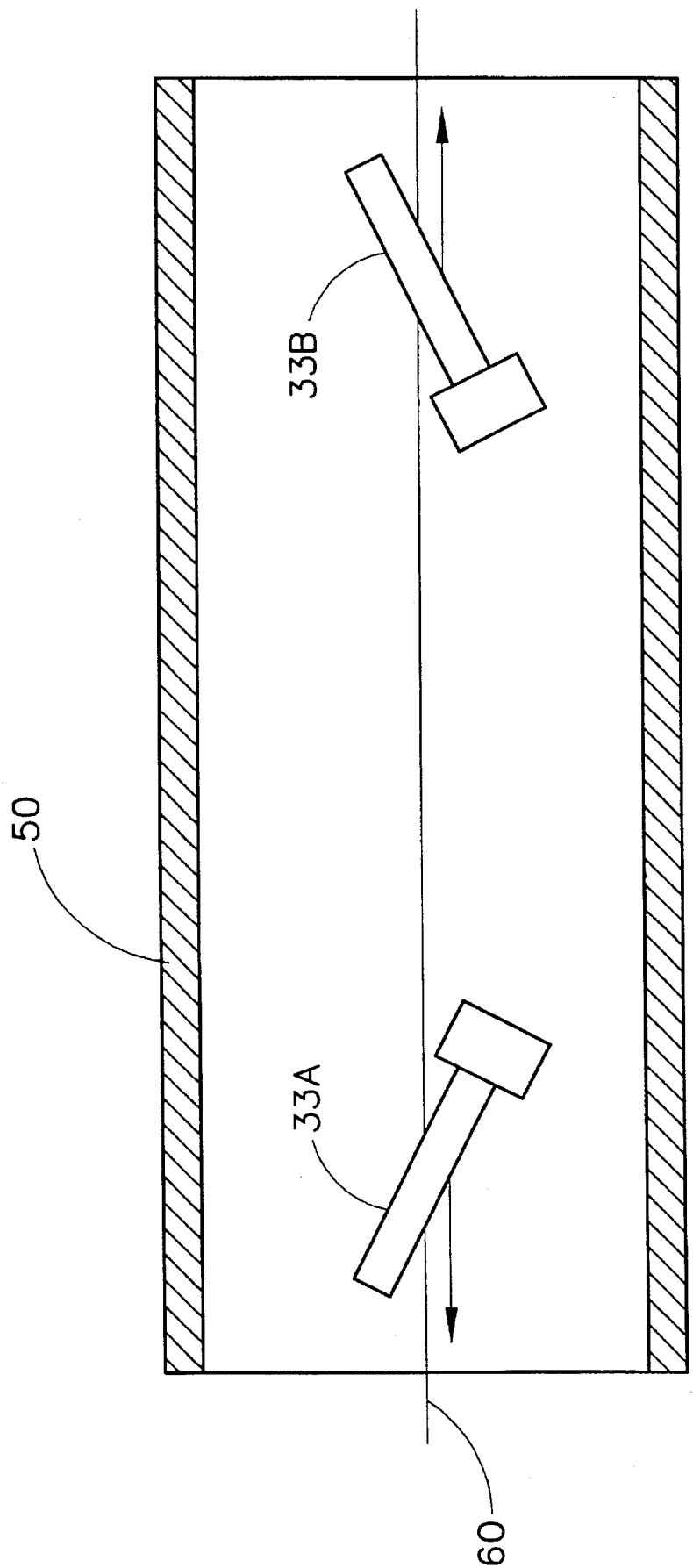
FIG. 5B is a sectional top view of a rotatable tube with two components disposed within it in opposite alignments.

As a result of the effects of the rotating tube on the components within the tube, the components move along the bottom of the tube 50 as described above. FIG. 5B shows a top section view of the tube 50 with two components, 33A and 33B, disposed within it. The rotation of tube 50 causes component 33A to move toward the left and component 33B to move toward the right in FIG. 5B. The interaction between the tube 50 and the components, 33A and 33B, also results in the slight misalignment between the centerlines of the components and the centerline of the tube 50. These misalignments are intentionally exaggerated in FIG. 5B for purposes of illustration. It should be understood that a sudden reversal of the direction of rotation of the tube 50 would result in a continued movement of the components, 33A and 33B, in the same directions described above, but with a change in the direction of the relative misalignments shown in FIG. 5B.

In order to implement the principles of the present invention, an apparatus such as that shown in FIG. 6 can be used. A rotatable tube 50 can be supported by bearings 70 and 72 for rotation about the central axis 60. In order to cause the rotation of the rotatable tube 50, a drive belt 76 can be provided and connected so that the rotation of a shaft 78 will cause the rotatable tube 50 to rotate about its central axis 60. A motor 80 can be used to rotate the shaft 70. It should be understood that the configuration shown in FIG. 6 is a highly simplified and schematic illustration of a means for rotating the rotatable tube. Alternative configurations, such as a gear driven arrangement, are within the scope of the present invention.

Figure 7:
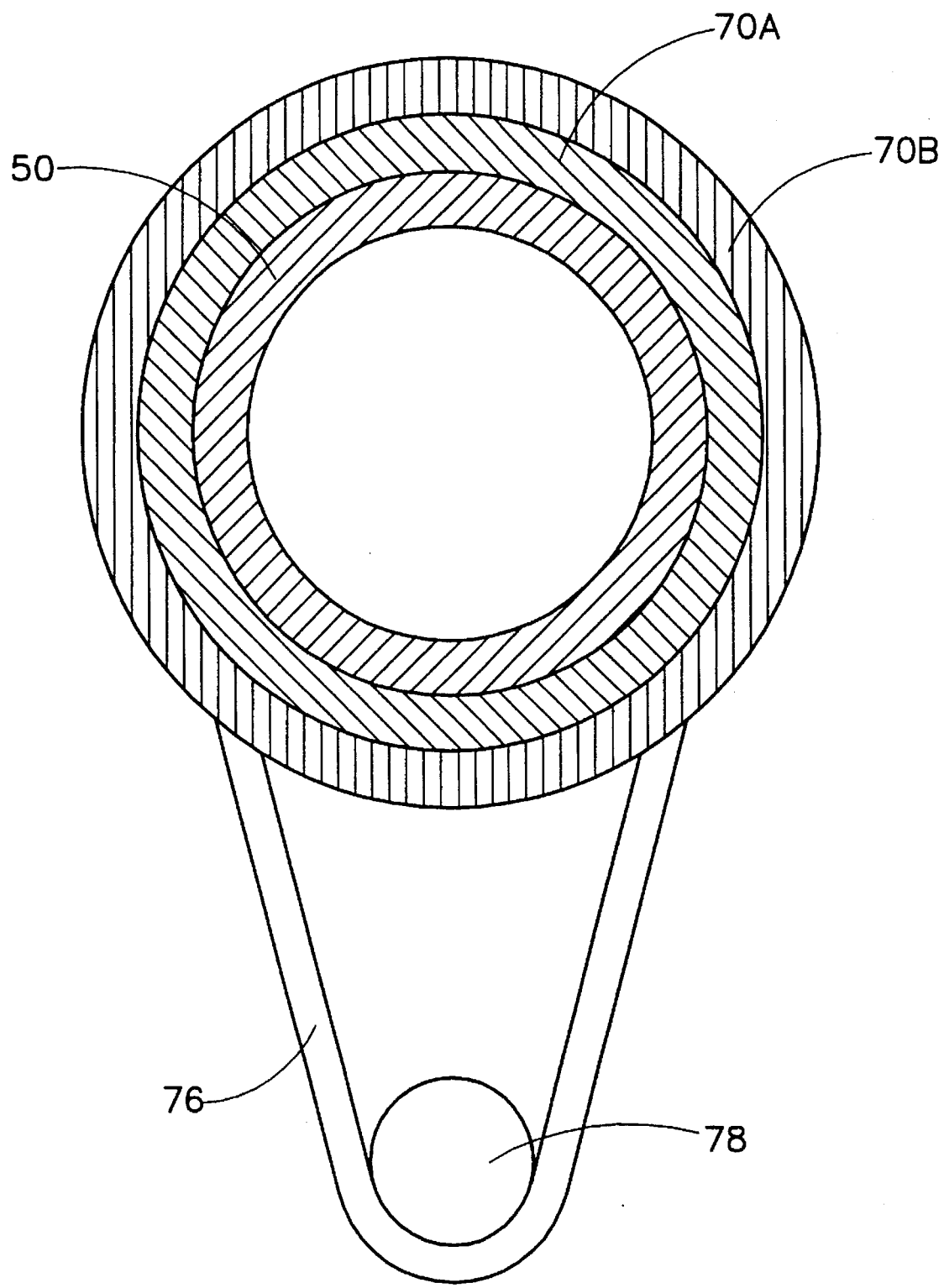
FIG. 7 is a sectional view of the system shown in FIG. 6.

FIG. 7 is an end view of the arrangement shown in FIG. 6. The bearing 70 in FIG. 6 is shown comprising an inner portion 70A and an outer portion 70B in FIG. 7. The inner portion 70A is attached to the rotatable tube 50. The drive belt 76 is shown connecting the shaft 78 with the tube 50.

Figure 8:
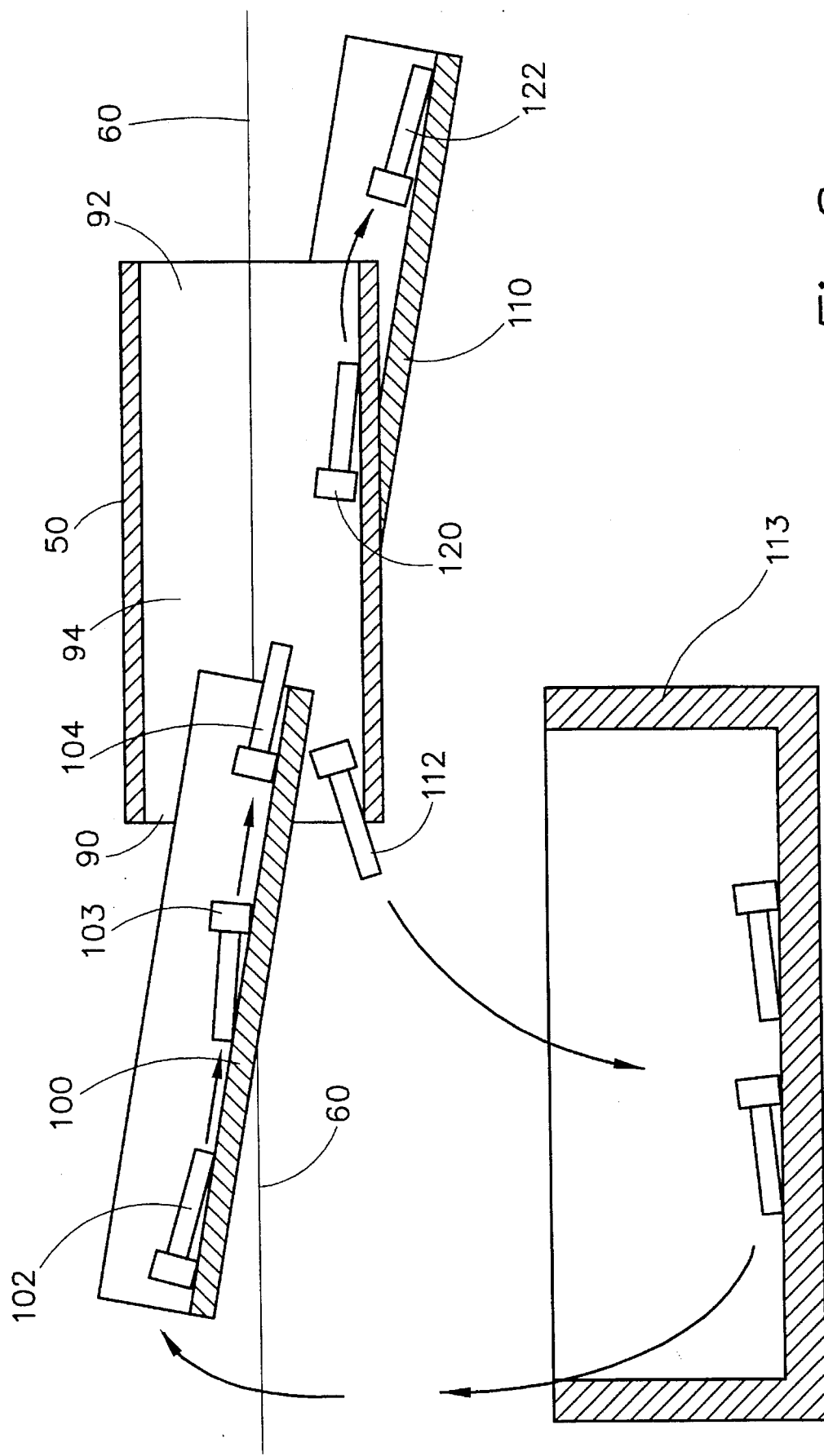
FIG. 8 is a schematic representation of a system that feeds components into a rotatable tube and removes the components according to the desirability or undesirability of their orientation.

FIG. 8 is a schematic representation of a sorting and feeding apparatus used to handle small component such as those shown in FIGS. 1A–1D. For purposes of clarity in the illustration of FIG. 8, associated support and driving apparatus are not shown. The rotatable tube 50 is shown with its central axis 60. The rotatable tube 50 has a first end 90 and a second end 92. A central portion 94 is located between the first and second ends. A means is provided for serially feeding a plurality of components into the central portion 94 of the rotatable tube 50. In FIG. 8, this serial feeding means is a track identified by reference numeral 100. In the track 100, a plurality of cap screws are shown. For purposes of the illustration, the cap screws identified by reference numerals 102 and 104 are oriented with their small diameter shafts pointing toward the right and down the slope of the track 100, but the component identified by reference numeral 103 is shown in an opposite orientation with its shaft pointing toward the left and up the track 100 while its larger diameter end is pointing toward the right and down the track 100. This illustrates that the feeding means is expected to deposit the components in the central portion 94 of the tube 50 without regard to their orientation or alignment direction. If a component is deposited from track 100 into the central portion 94 of the tube 50 in an undesirable orientation, such as that represented by reference numeral 112, a means is provided for receiving selected ones of the components which are deposited into the central portion of the tube in that undesirable orientation and returning those selected ones of the components to the serial feeding means. In FIG. 8, this is accomplished by allowing the components that move out of the first end 90 to fall into the return tray, or hopper, of a feeder bowl 113. By employing spiral tracks within the feeder bowl 113 and associating the track 100 with the spiral track of the feeder bowl, the parts can be caused to move back toward the track 100 and eventually be redeposited into the central portion 94 of the tube 50. The arrows in FIG. 8 illustrate the possible paths along which the components can move. All of the components which are deposited into the central portion 94 of the tube, but are of the undesirable orientation, are returned to the feeder bowl 113 to be recycled. The components, such as that identified by reference numeral 120 in FIG. 8, which are deposited into the central portion 94 of the tube 50 in the desirable orientation, are caused to move toward the second end 92 of the tube and are eventually deposited in track 110 as represented by the component identified by reference numeral 122.

With continued reference to FIG. 8, it can be seen that cap screws are deposited into the central portion 94 of the tube by the track 100 in a generally random manner in which the components can assume either of two opposite orientations or alignment directions. These two opposite directions are illustrated by components 112 and 120. Component 120 is in a desirable orientation and component 112 is in an undesirable orientation. The components that are in the desirable orientation are feed to another track 110 which eventually feeds the components into an automatic machine that assembles them to other devices. The components that are in an undesirable orientation are returned to a feeder mechanism, such as the vibratory bowl 113, to be recycled and fed into track 100 again. This process continues indefinitely, with the properly oriented components moving toward track 110 and the improperly oriented components moving back to the feeder mechanism. The system shown schematically in FIG. 8 is made possible by the rotation of the rotatable tube 50 and the present invention which takes advantage of the natural behavior of the movement of cylindrical objects within the inside surface of a tube. The system shown in FIG. 8 permits the feeding and sorting of components, such as those shown in FIGS. 1A–1D, which are generally symmetrical about their centerlines, but which have diameters of different magnitudes.

Figure 9:
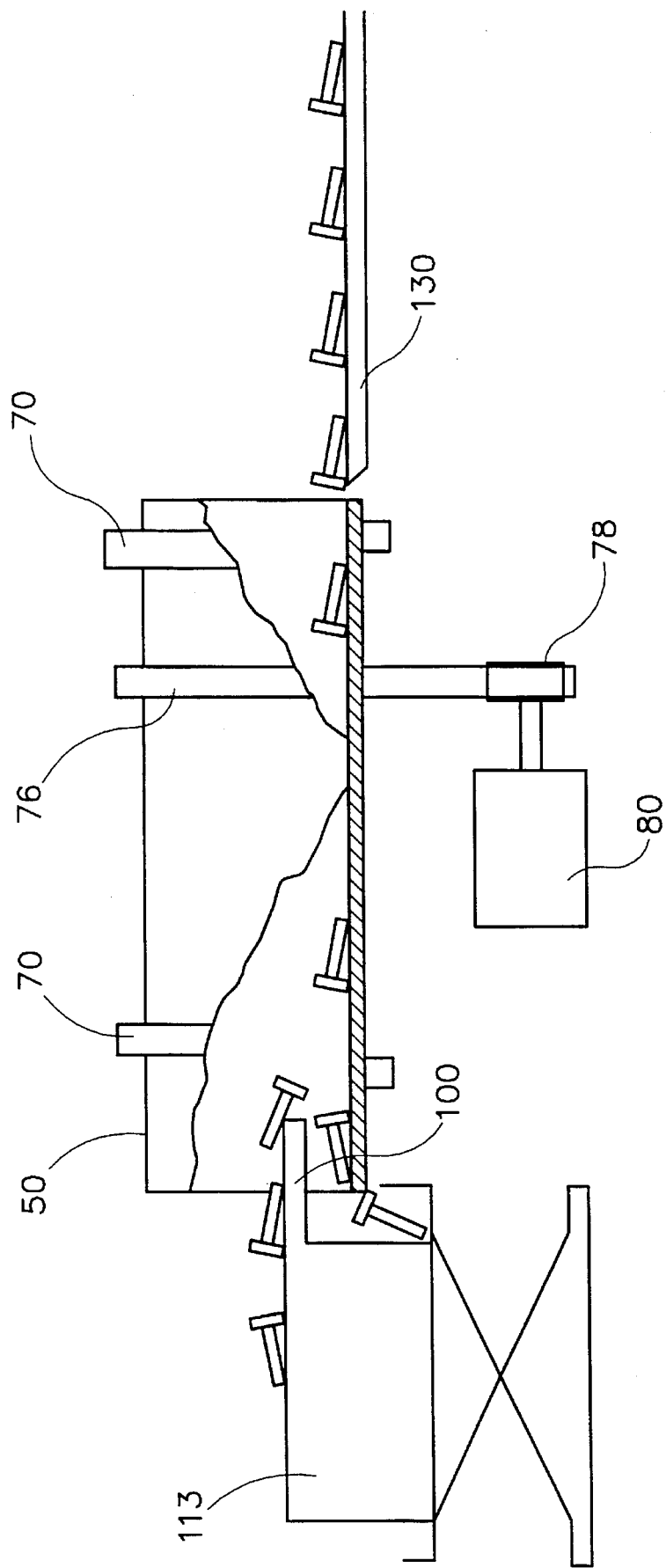
FIG. 9 shows an alternative arrangement of the present invention.

FIG. 9 shows an alternative arrangement in which the present invention is associated with an in-line vibratory feeder 130. In addition, the in-line feeder 130 is arranged in a nonshingled configuration with the tube, contrary to the arrangement shown in FIG. 8.

In one particular application of the present invention, a knurled pin such as that shown in FIG. 1A typically has a first end 10 that has a diameter of approximately 0.092 inches and a second end 12 that has a diameter of approximately 0.100 inches. Since the knurled end has a plus tolerance of 0.002 inches and a minus tolerance of 0.003 inches while the first end 10 has a plus tolerance of 0.001 inches and no negative tolerance, the difference in diameter between the first end 10 and the second end 12 can be as little as 0.004 inches. The present invention is able to handle and sort these components without the need of expensive fixtures and tooling. In order to sort these components using conventional feeding and sorting techniques, the equipment would be significantly more complex and the costs would be much higher than the relatively simple system shown schematically in FIG. 8 which employs the principles of the present invention.

Although the present invention has been described with particular specificity and illustrated to show a particularly preferred embodiment of the present invention, it should be understood that alternative embodiments are also within its scope.

The embodiments of the invention in which an exclusive property or right is claimed are defined as follows:

1. A component handling apparatus, comprising:

a rotatable tube having a first end, a second end and a central portion between said first and second ends;

means for serially feeding a plurality of components into said central portion of said rotatable tube;

first means, disposed proximate said first end of said rotatable tube, for receiving selected ones of said components which are deposited into said central portion of said rotatable tube with a first orientation and which move out of said first end of said rotatable tube;

means, attached to said first receiving means, for returning said selected ones of said components to said serially feeding means;

second means, disposed proximate said second end of said rotatable tube, for receiving selected others of said components which are deposited into said central portion of said rotatable tube with a second orientation and which move out of said rotatable tube at said second end; and means for rotating said rotatable tube about a central axis.

2. The component handling apparatus of claim 1, wherein:

said serially feeding means comprises a vibratory bowl feeder in combination with an attached feeder track, a distal end of said feeder track extending into said rotatable tube proximate said central portion.

3. The component handling apparatus of claim 1, wherein:

each of said components is generally cylindrical with one end having a larger diameter than another end.

4. The component handling apparatus of claim 1, wherein:

said rotatable tube a plurality of radial openings extending through the wall thereof.

5. A component handling apparatus, comprising:

a rotatable tube having a first end, a second end and a central portion between said first and second ends;

means for serially feeding a plurality of components into said central portion of said rotatable tube, said serially feeding means comprising a vibratory bowl feeder in combination with an attached feeder track, a distal end of said feeder track extending into said rotatable tube proximate said central portion;

first means, disposed proximate said first end of said rotatable tube, for receiving selected ones of said components which are deposited into said central portion of said rotatable tube with a first orientation and which move out of said first end of said rotatable tube;

means, attached to said first receiving means, for returning said selected ones of said components to said serially feeding means;

second means, disposed proximate said second end of said rotatable tube, for receiving selected others of said components which are deposited into said central portion of said rotatable tube with a second orientation and which move out of said rotatable tube at said second end; and means for rotating said rotatable tube about a central axis.

6. The component handling apparatus of claim 5, wherein:

each of said components is generally cylindrical with one end having a larger diameter than another end.

7. The component handling apparatus of claim 5, wherein:

said rotatable tube a plurality of radial openings extending through the wall thereof.

8. A component handling apparatus, comprising:

a rotatable tube having a first end, a second end and a central portion between said first and second ends;

means for serially feeding a plurality of components into said central portion of said rotatable tube, said serially feeding means comprising a vibratory bowl feeder in combination with an attached feeder track, a distal end of said feeder track extending into said rotatable tube proximate said central portion, each of said components being generally cylindrical with one end having a larger diameter than another end;

first means, disposed proximate said first end of said rotatable tube, for receiving selected ones of said components which are deposited into said central portion of said rotatable tube with a first orientation and which move out of said first end of said rotatable tube;

means, attached to said first receiving means, for returning said selected ones of said components to said serially feeding means;

second means, disposed proximate said second end of said rotatable tube, for receiving selected others of said components which are deposited into said central portion of said rotatable tube with a second orientation and which move out of said rotatable tube at said second end; and means for rotating said rotatable tube about a central axis.

9. The component handling apparatus of claim 8, wherein:

said rotatable tube a plurality of radial openings extending through the wall thereof.

* * * * *